(12) United States Patent
Nishida et al.

(10) Patent No.: US 8,033,941 B2
(45) Date of Patent: Oct. 11, 2011

(54) LUBRICATING OIL FEEDING DEVICE FOR AUTOMATIC TRANSMISSION

(75) Inventors: Masaaki Nishida, Anjo (JP); Hiroshi Kato, Kariya (JP); Masashi Kitou, Anjo (JP); Yuichi Seki, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 610 days.

(21) Appl. No.: 12/216,508

(22) Filed: Jul. 7, 2008

(65) Prior Publication Data
US 2009/0017954 A1 Jan. 15, 2009

(30) Foreign Application Priority Data

Jul. 5, 2007 (JP) ................................. 2007-177824
Jul. 6, 2007 (JP) ................................. 2007-178743

(51) Int. Cl.
*F16H 57/04* (2010.01)
(52) U.S. Cl. ...................................... 475/160; 192/113.5
(58) Field of Classification Search ................ 192/85.25, 192/106 F, 113.5
See application file for complete search history.

(56) References Cited

U.S. PATENT DOCUMENTS

| | | | |
|---|---|---|---|
| 5,195,400 A * | 3/1993 | Hayakawa et al. ......... 74/606 R |
| 5,480,362 A | 1/1996 | Tanaka et al. | |
| 5,910,062 A | 6/1999 | Mizuta | |
| 7,001,298 B2 * | 2/2006 | Biermann et al. ............. 475/116 |
| 2006/0065488 A1 * | 3/2006 | Sugihara et al. ............. 184/6.12 |
| 2006/0264297 A1 | 11/2006 | Seki et al. | |
| 2009/0029820 A1 * | 1/2009 | Nishida et al. ................ 475/159 |

FOREIGN PATENT DOCUMENTS

| | | |
|---|---|---|
| JP | U-63-84443 | 6/1988 |
| JP | A-02-138537 | 5/1990 |
| JP | U-2-84053 | 6/1990 |
| JP | A-06-081905 | 3/1994 |
| JP | A-10-038058 | 2/1998 |
| JP | A-2006-250253 | 9/2006 |
| JP | 2006322602 A * | 11/2006 |
| JP | A-2006-349162 | 12/2006 |

* cited by examiner

*Primary Examiner* — Justin Holmes
(74) *Attorney, Agent, or Firm* — Oliff & Berridge, PLC

(57) ABSTRACT

A lubricating oil feeding device includes a carrier and a carrier cover that are attached to both ends of the pinion shaft of the planetary gear and that are arranged in an axial direction of an input shaft of the automatic transmission; an oil sump groove that opens in a peripheral direction and the axial direction of the input shaft, the oil sump groove is structured by a wall portion of the carrier cover formed radiating from a center of the input shaft, a base portion of the carrier cover that extends in an axial direction of the pinion shaft, and an end portion on an inner peripheral surface of a clutch hub that is connected with the base portion; and an oil passage that feeds lubricating oil from the oil sump groove to the pinion shaft, and provides the lubricating oil for the planetary gear.

20 Claims, 4 Drawing Sheets

LUBRICATING OIL FEEDING DEVICE FOR AUTOMATIC TRANSMISSION

CROSS-REFERENCE TO RELATED APPLICATION

The disclosure of Japanese Patent Application No. 2007-177824 filed on Jul. 5, 2007 and Japanese Patent Application No. 2007-178743 filed on Jul. 6, 2007 including the specification, drawings and abstract are incorporated herein by reference in their entirety.

BACKGROUND

The present invention relates to a lubricating oil feeding device for an automatic transmission.

There exists a lubricating oil feeding device for an automatic transmission as disclosed in Japanese Patent Application Publication No. JP-A-H10-38058 and Japanese Patent Application Publication No. JP-A-2006-250253. Japanese Patent Application Publication No. JP-A-H10-38058 discloses a distance in a radial direction from an input shaft (21) (note here that numerals in parentheses denote components in drawings from Japanese Patent Application Publication No. JP-A-H10-38058 and Japanese Patent Application Publication No. JP-A-2006-250253) to an oil seal line (35) of an oil catch member (29) is uneven due to a generally linear portion (35a). A centrifugal force thus generated by a rotation centered on the input shaft (21) further generates a component force in a layout direction of adjacent pinion shafts (7a, 7a). The component force guides lubricating oil held in the oil catch member (29) so as to flow in the layout direction of the pinion shafts (7a, 7a). Furthermore, in Japanese Patent Application Publication No. JP-A-H10-38058, an oil passage (28) is formed along a generally linear portion (35a) of the oil seal line (35) such that lubricating oil flows via the oil passage (28) from an opening on a pinion arrangement position side to lubricate the pinion shaft (7a), a needle bearing (7b), and a pinion (7).

In Japanese Patent Application Publication No. JP-A-2006-250253, a centrifugal force due to rotation of an input shaft (12) feeds a portion of lubricating oil from an oil hole (12a) formed in the input shaft (12) to an oil hole (22a) of a first sun gear (22), and rotation of the first sun gear (22) then feeds the lubricating oil to an inward radial-direction hole (50) formed in a support wall (44), after which the lubricating oil is fed from a radial-direction hole (52) of a pinion shaft (68) and a pinion shaft (32) to an axial-direction hole (54). The lubricating oil introduced from the axial-direction hole (54) of the pinion shaft (68) and the pinion shaft (32) is then guided to outer peripheral surfaces of the pinion shaft (68) and the pinion shaft (32), which are formed on the pinion shaft (68) and the pinion shaft (32), whereby the lubricating oil is fed to a lubricating oil feed hole (86).

SUMMARY

Japanese Patent Application Publication No. JP-A-H10-38058 has many parts and due to a structure including an oil catch member (29) and a carrier plate (10), it is impossible to achieve an automatic transmission that is compact overall.

Japanese Patent Application Publication No. JP-A-2006-250253 forms a lubricating oil passage in a support wall (44), and is therefore capable of shortening a dimension in an axial direction. However, there is a limit to how large a diameter of an axial-direction hole (52) can be made in cases where more feeding of lubricating oil to a pinion shaft (32) is desired. Therefore, it is impossible to achieve an automatic transmission that is compact overall.

Hence, the present invention was devised in order to resolve such problems, and it is an object of the present invention to provide a lubricating oil feeding device for an automatic transmission that is capable of sufficiently feeding lubricating oil to a planetary gear and with which a compact automatic transmission can be easily achieved. The present invention can also achieve various other advantages.

A lubricating oil feeding device for an automatic transmission, wherein the lubricating oil feeding device feeds lubricating oil to a pinion and a pinion shaft of a planetary gear arranged in an internal portion of the automatic transmission, according to an exemplary aspect of the present invention, includes a carrier and a carrier cover that are attached to both ends of the pinion shaft of the planetary gear and that are arranged in an axial direction of an input shaft of the automatic transmission; an oil sump groove that opens in a peripheral direction and the axial direction of the input shaft, the oil sump groove is structured by a wall portion of the carrier cover formed radiating from a center of the input shaft, a base portion of the carrier cover that extends in an axial direction of the pinion shaft, and an end portion on an inner peripheral surface of a clutch hub that is connected with the base portion; and an oil passage that feeds lubricating oil from the oil sump groove to the pinion shaft, and provides the lubricating oil for the planetary gear.

A lubricating oil feeding device for an automatic transmission, wherein the lubricating oil feeding device feeds lubricating oil to a pinion and a pinion shaft of a planetary gear arranged in an internal portion of the automatic transmission, according to an exemplary aspect of the present invention, includes a carrier and a carrier cover that are attached to both ends of the pinion shaft of the planetary gear and that are arranged in an axial direction of an input shaft of the automatic transmission; and an oil sump groove that opens in a peripheral direction and the axial direction of the input shaft, the oil sump groove is structured by a wall portion of the carrier cover formed radiating from a center of the input shaft, a base portion of the carrier cover that extends in an axial direction of the pinion shaft, and an end portion on an inner peripheral surface of a clutch hub that is connected with the base portion, wherein: lubricating oil to be fed from a lubricating oil hole of a boss portion of a clutch drum arranged in a periphery of the input shaft is delivered to the oil sump groove from a drain groove formed in a radial direction of a cancel plate without passing through an intermediary along the way.

BRIEF DESCRIPTION OF THE DRAWINGS

Various exemplary aspects of the invention will be described with reference to the drawings, wherein.

DETAILED DESCRIPTION OF EMBODIMENTS

Figure 1:
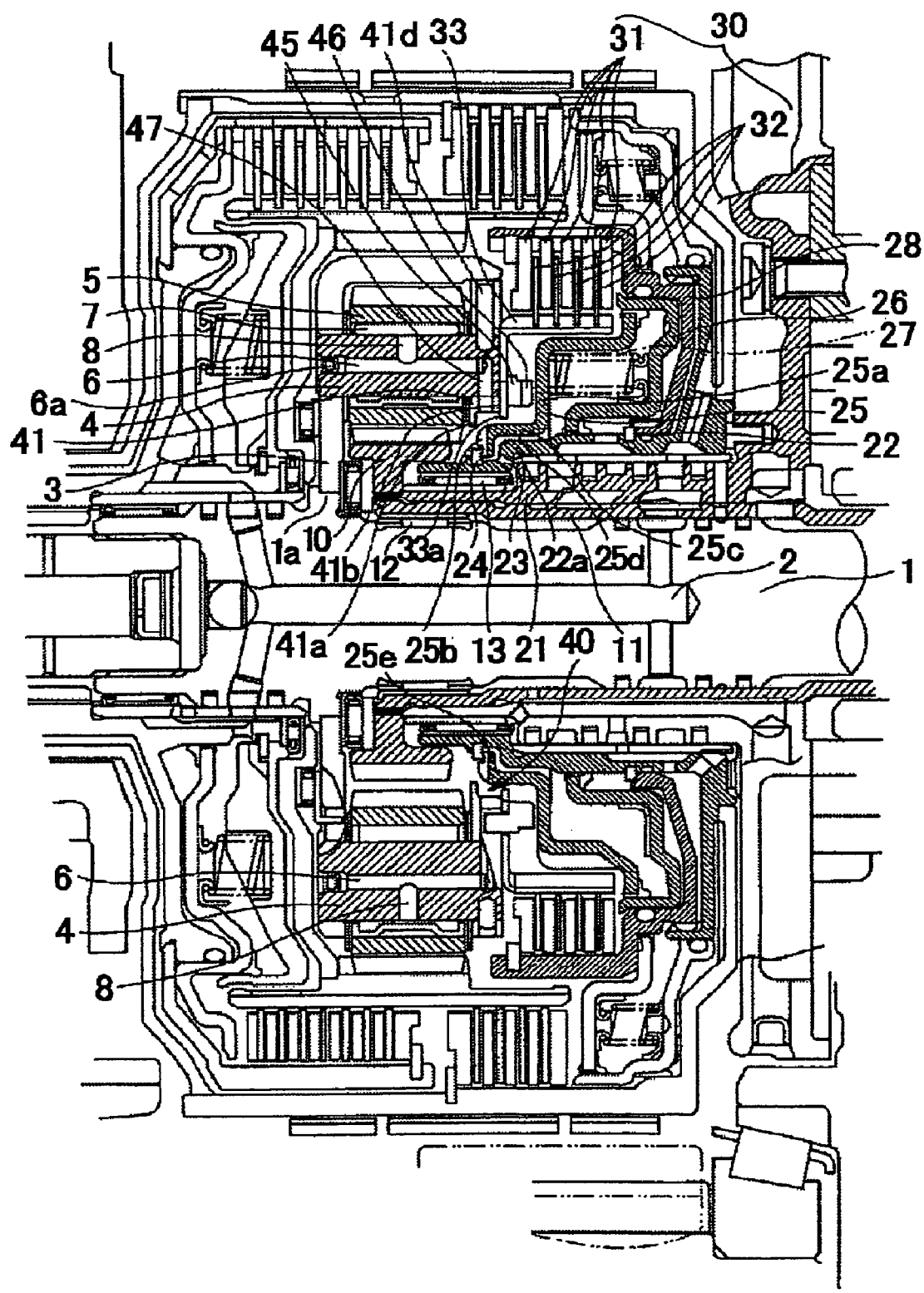
FIG. 1 is a cross-sectional view showing a portion of a lubricating oil feeding device for an automatic transmission according to a first embodiment of the present invention.

Embodiments of the present invention will be described below with reference to the drawings. Note that like symbols and like reference numerals used for the embodiments in the drawings denote like or equivalent functional portions, so duplicate descriptions will be omitted here.

Figure 2:
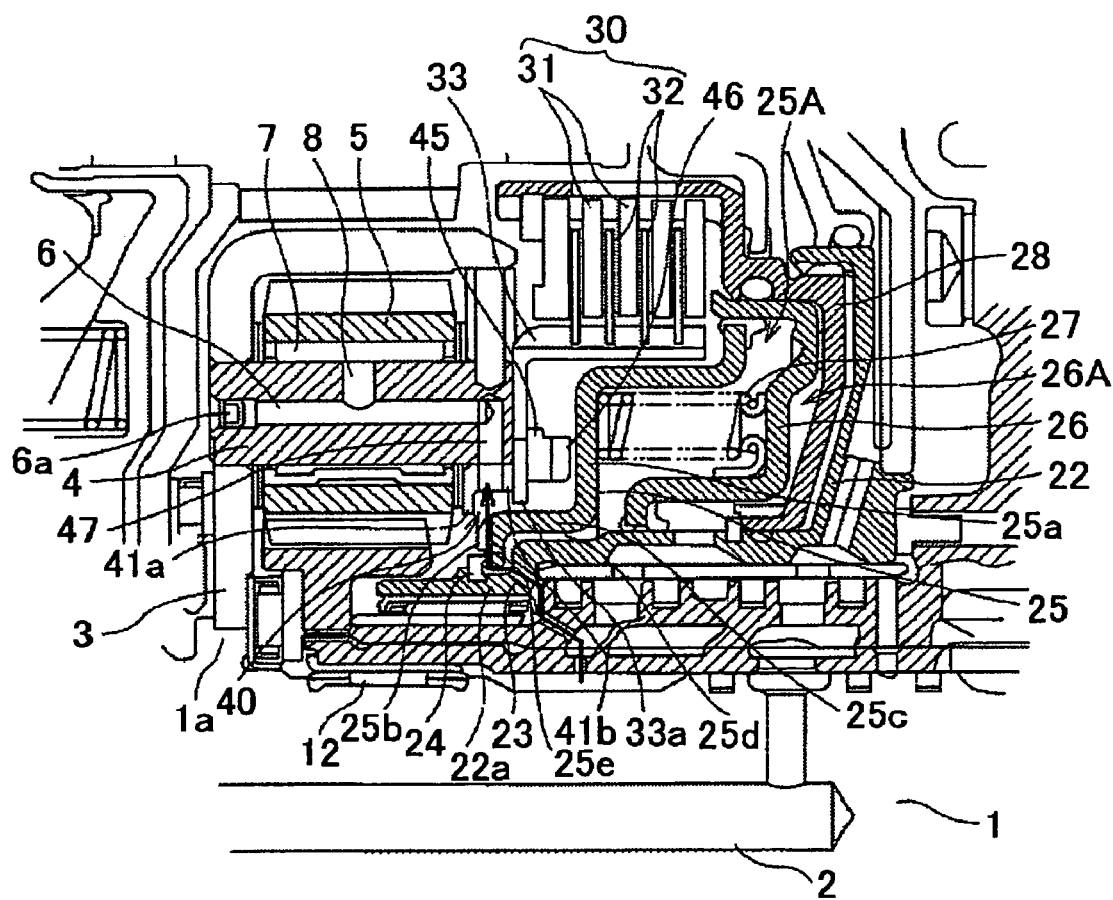
FIG. 2 is an explanatory view showing a flow of lubricating oil in a cross-sectional view of a portion of the lubricating oil feeding device for an automatic transmission according to the first embodiment of the present invention.
Figure 3:
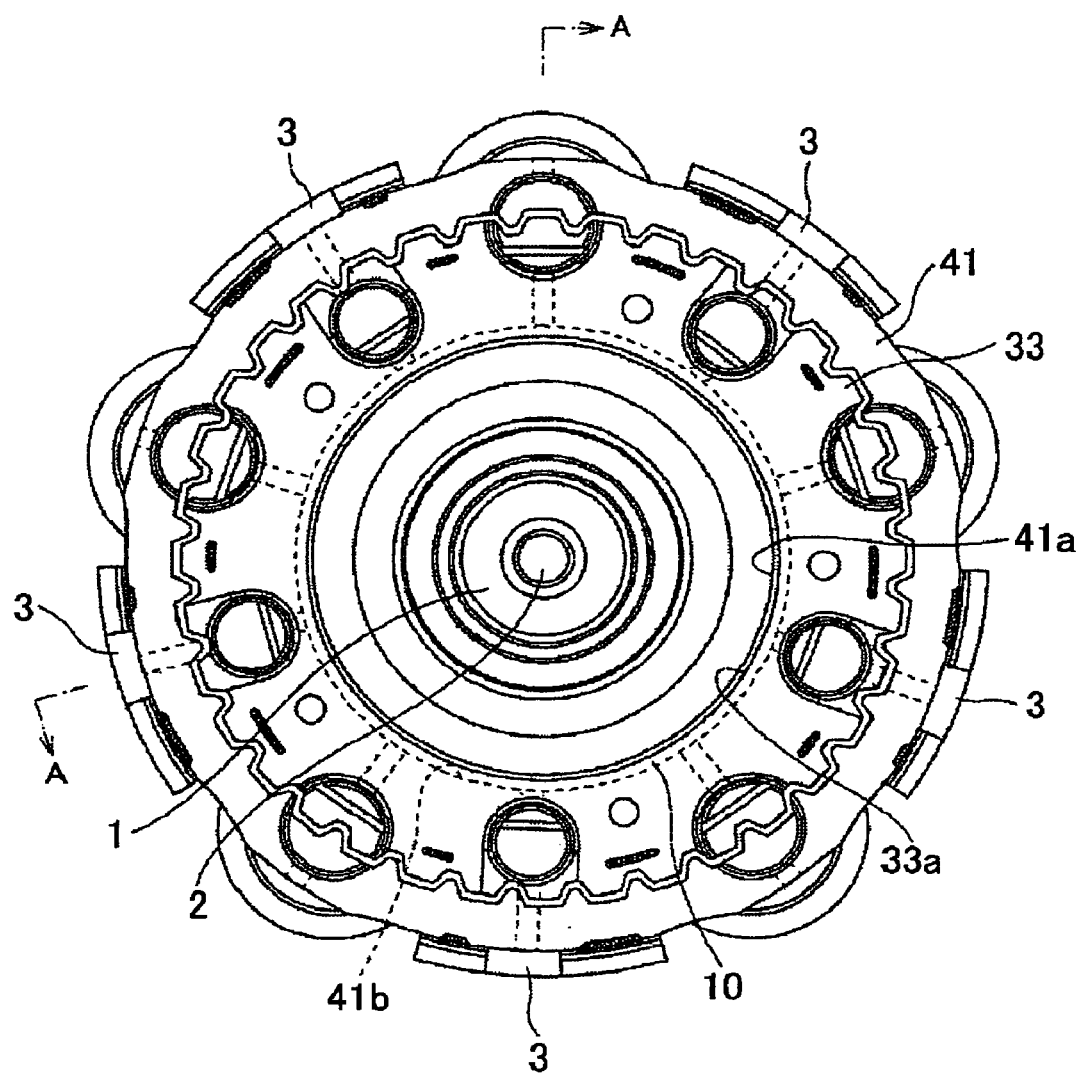
FIG. 3 is a side view showing a portion of the lubricating oil feeding device for an automatic transmission according to the first embodiment of the present invention.
Figure 4:
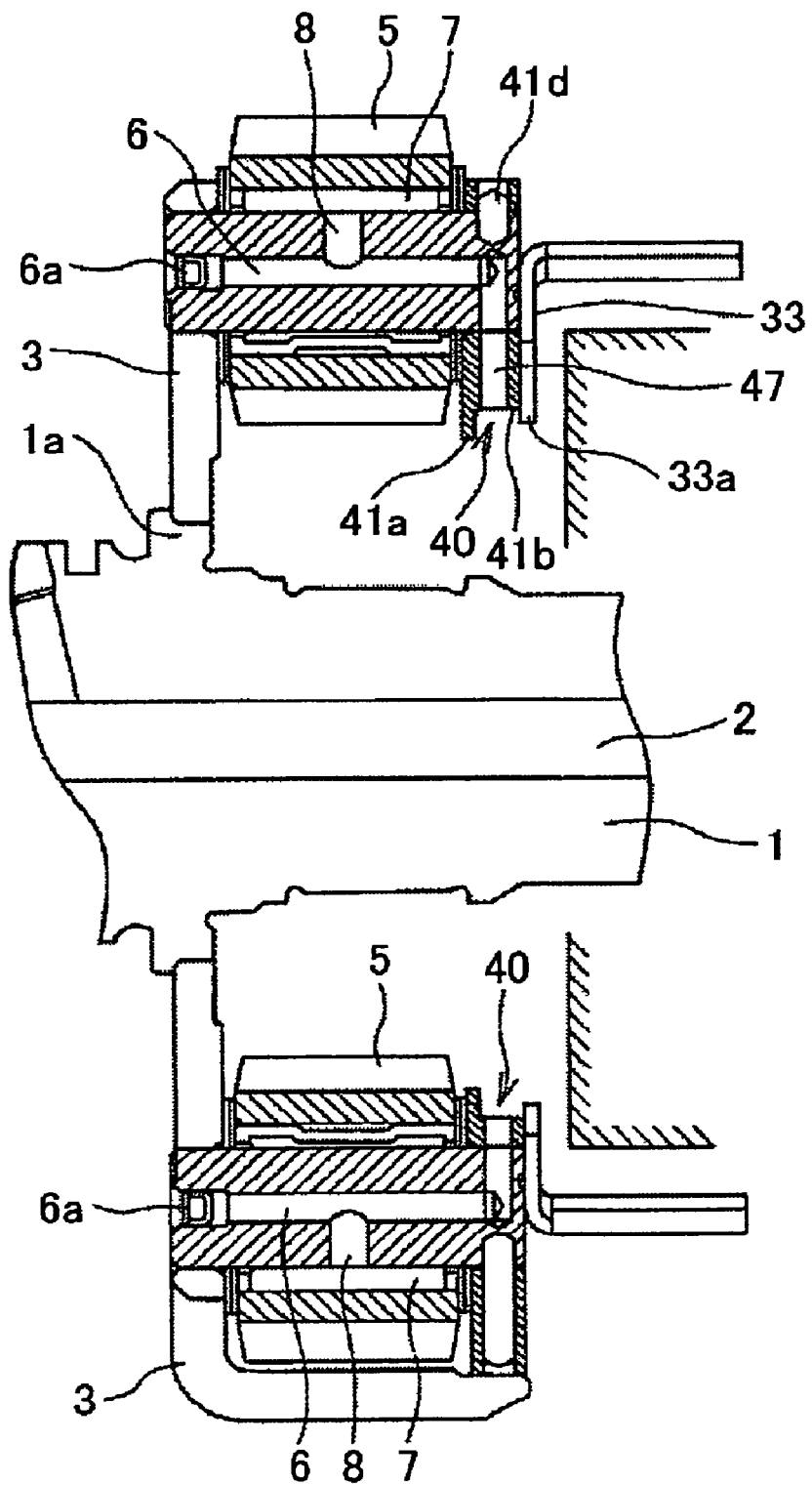
FIG. 4 is a cross-sectional view showing a portion of the lubricating oil feeding device for an automatic transmission according to the first embodiment of the present invention, and corresponds to a cross section taken along a section line A-A in FIG. 3.

FIG. 1 is a cross-sectional view showing a portion of a lubricating oil feeding device for an automatic transmission according to a first embodiment of the present invention. FIG. 2 is an explanatory view showing a flow of lubricating oil in a cross-sectional view of a portion of the lubricating oil feeding device for an automatic transmission according to the first embodiment of the present invention. FIG. 3 is a side view showing a portion of a lubricating oil feeding device for an automatic transmission according to the first embodiment of the present invention. FIG. 4 is a cross-sectional view showing a portion of the lubricating oil feeding device for an automatic transmission according to the first embodiment of the present invention, and corresponds to a cross section taken along a section line A-A in FIG. 3.

In the figures, an input shaft 1 has an engine as a driving source, and is a shaft to which a rotation from a torque converter is input. A lubricating oil hole 2 feeds necessary lubricating oil to various functional parts which has been delivered from a pump, and the lubricating oil hole 2 is formed extending in an axial direction of the input shaft 1 (wherein a right-left direction in FIG. 1 denotes a center axial direction thereof).

A generally cylindrical and bottomed carrier 3 is attached to a flange 1a of the input shaft 1 so as to integrally rotate therewith. A support wall portion (hereinafter, a surface portion extending in a radial direction and centered on the input shaft 1 will be referred to as a wall portion or a support wall portion, and considered a wall in the following description) corresponding to the bottom of the generally cylindrical and bottomed carrier 3 has a plurality of pinion shafts 4 attached. A plurality of pinions (pinion gears) 5 is rotatably attached to the pinion shafts 4 via needle bearings 7. The pinion shaft 4 is formed with a lubricating oil hole 6, and an end portion thereof is sealed by a sealing member 6a. In addition, a lubricating oil hole 8 is formed extending from the lubricating oil hole 6 in a radial direction thereof, whereby lubricating oil is fed to the needle bearing 7 placed between the pinion shaft 4 and the pinion 5.

While the generally cylindrical and bottomed carrier 3 fixes an end of the pinion shaft 4, another end of the pinion shaft 4 is fixed to a generally toric carrier cover 41 formed from a separate member. The generally toric carrier cover 41 is integratedly attached to an opening side of the generally cylindrical and bottomed carrier 3 so as to firmly fix the pinion shaft 4. To this end, a pin 41d integratedly attaches the carrier cover 41 and the pinion shaft 4.

An inner side of generally toric carrier cover 41, i.e., a generally toric inner side of a virtual circle centered on the input shaft 1, is formed with a wall portion 41a such that a diameter of the virtual circle centered on the input shaft 1 becomes smaller. In addition, a base portion 41b continued from the wall portion 41a is formed extending in the axial direction of the pinion shaft 4. Accordingly, a silhouette line of an inner peripheral cross section of the carrier cover 41 is an L shape.

Note that both ends of the pinion 5 on the periphery of the pinion shaft 4 are provided with metal washers, which are used to achieve relative rotation among the pinion 5, the carrier 3, and the carrier cover 41.

Moreover, due to an inward end portion 33a of a clutch hub 33, which is connected to the base portion 41b of the carrier cover 41, an oil sump groove 40 is formed in the carrier cover 41 in a peripheral direction, with the oil sump groove 40 opening in the axial direction of the input shaft 1 and receiving lubricating oil.

The height of the inward end portion 33a of the clutch hub 33, when using a distance of the base portion 41b of the carrier cover 41 from the oil sump groove 40 as a reference, is set lower than the height of the wall portion 41a of the carrier cover 41. Namely, a structure is achieved wherein, when the oil sump groove 40 is filled up with lubricating oil, the lubricating oil exceeds the height of the end portion 33a of the clutch hub 33 and is delivered elsewhere. In other words, regarding the inward end portion 33a of the clutch hub 33 in terms of the diameter of the virtual circle centered on the input shaft 1, the diameter of an inner end of the wall portion 41a is set smaller than the diameter of the end portion 33a of the clutch hub 33.

The pinion 5 of the pinion shaft 4 meshes with a sun gear 10. The sun gear 10 is held stationary and connected with a stator shaft 11 that is fixed to a case of the automatic transmission. The stator shaft 11 and the input shaft 1 are rotatably attached via a needle bearing 12. A boss portion attached to the input shaft 1 of the sun gear 10 is attached with a sleeve member 21. Moreover, a boss portion 22a of a clutch drum 22 is provided on the sleeve member 21 via a needle bearing 13. The boss portion 22a of the clutch drum 22 is also provided with a lubricating oil hole 23. Lubricating oil delivered to the lubricating oil hole 2 of the input shaft 1 by an oil pump is fed via the sleeve member 21 from the lubricating oil hole 23 of the boss portion 22a of the clutch drum 22 to a support portion 25e side of a cancel plate 25, whose movement is restricted by a snap ring 24.

A piston member 26 is slidably provided on a periphery of the boss portion 22a of the clutch drum 22. Also, a return spring 27 is provided between the clutch drum 22 and the cancel plate 25. Namely, the return spring 27 applies an elastic force such that a distance between the cancel plate 25 and the piston member 26 is expanded.

A servo oil chamber 26A is formed between a drum member 28 and the piston member 26. An oil pressure controlled by a control valve (not shown) is introduced into the servo oil chamber 26A, whereby the piston member disengages a clutch 30 formed from a clutch plate 31 and a clutch disc 32. The clutch 30 is structured such that an inner side position in a radial direction centered on the input shaft 1 is supported by a clutch hub 33, while an outer peripheral side is supported by the drum member 28.

A resin washer 45 is provided between the clutch hub 33 and the cancel plate 25 of the clutch 30, and restricts an axial movement of the clutch hub 33. The resin washer 45 is insertedly fixed into an attachment hole formed in the clutch hub 33, and has a structure that does not allow easy separation.

In addition, the resin washer 45 is formed with a groove 46 that extends in the radial direction of the input shaft 1. Due to rotation of the clutch hub 33, the groove 46 is capable of feeding lubricating oil to the clutch 30, even in an automatic transmission structured compact where lubricating oil exceeding the end portion 33a of the clutch hub 33 flows to the resin washer 45 side, and is delivered to a plurality of clutch plates 31 and clutch discs 32 of the clutch 30 via the radial-direction groove 46 of the resin washer 45.

At the center of the oil sump groove 40, a lubricating oil hole 47 is formed that is in communication with the lubricating oil holes 6 in the plurality of pinion shafts 4. Accordingly, lubricating oil that collects in the oil sump groove 40 is delivered to the lubricating oil holes 6 of the plurality of pinion shafts 4 via the lubricating oil hole 47. Lubricating oil delivered to the lubricating oil hole 6 is gradually fed to the needle bearing 7 via the lubricating oil hole 8. It should be noted that once lubricating oil collected in the oil sump groove 40 exceeds the end portion 33a of the clutch hub 33, lubricating oil is flung by centrifugal force to the clutch 30 side, and is thus fed to the clutch 30.

The lubricating oil feeding device for an automatic transmission according to the present embodiment structured as described above is capable of operating as follows.

Once lubricating oil delivered by the oil pump is fed to the lubricating oil hole 2 of the input shaft 1, the lubricating oil passes through the lubricating oil hole 23 of the boss portion 22a of the clutch drum 22. Thereafter, the lubricating oil is scattered by centrifugal force from a drain groove 25b formed on an end portion of the cancel plate 25, with such scattering occurring from an axial direction of the input shaft 1 of the automatic transmission toward a radial direction thereof.

The scattered lubricating oil is received by the oil sump groove 40, which opens in the axial direction of the input shaft 1. The oil sump groove 40 is formed by the following: the wall portion 41a of the generally toric carrier cover 41 that attaches the pinion shaft 4 with the carrier 3; the base portion 41b of the carrier cover 41, which extends in the axial direction of the pinion shaft 4; and the inward end portion 33a of the clutch hub 33, which is connected with the base portion 41b of the carrier cover 41. Since the base portion 41b of the carrier cover 41 is formed with the lubricating oil hole 47 that is in communication with the lubricating oil hole 6 of the pinion shaft 4, when lubricating oil collects in the oil sump groove 40, the lubricating oil is delivered to the lubricating oil hole 6 of the pinion shaft 4 via the lubricating oil hole 47. Lubricating oil delivered to the lubricating oil hole 6 can then be gradually fed to the needle bearing 7 via the lubricating oil hole 8.

Thus, according to the lubricating oil feeding device for an automatic transmission, which feeds lubricating oil to the pinion shaft 4 and the pinion 5 of the planetary gear arranged in an internal portion of the automatic transmission in the present embodiment, the peripheral-direction oil sump groove 40 on the carrier cover 41, which opens in the axial direction of the input shaft 1 and receives lubricating oil, is formed by the following: the wall portion 41a of the generally toric carrier cover 41 that attaches the pinion shaft 4 with the carrier 3; the base portion 41b of the carrier cover 41, which extends in the axial direction of the pinion shaft 4; and the inward end portion 33a of the clutch hub 33, which is connected with the base portion 41b of the carrier cover 41.

As a consequence, compared with forming the oil sump groove 40 from both wall portions of the carrier cover 41 extending in the radial direction of the pinion shaft 4 and the base portion 41b of the carrier cover 41 that extends in an axial direction therebetween, for example, forming the oil sump groove 40 from the end portion 33a of the clutch hub 33 and the wall portion 41a of the carrier cover 41 extending in the radial direction of the pinion shaft 4, and from the base portion 41b of the carrier cover 41 extending in the axial direction of the input shaft 1 therebetween, enables narrowing of a width thereof in the axial direction of the input shaft 1 and achieves an automatic transmission that is more compact overall. Naturally, the use of other parts is no longer needed and also allows the automatic transmission to be made more compact overall.

At this time, the pinion shaft 4 of the present embodiment may be any pinion shaft 4 of a planetary gear in the case of a multi-speed automatic transmission, and the present invention is not limited to the pinion 5 arranged at a specific position as in the case of the present embodiment. In addition, the wall portion 41a of the carrier cover 41 extending in the radial direction of the pinion shaft 4 and the base portion 41b of the carrier cover 41 extending in the axial direction of the pinion shaft 4 are not limited, provided that a generally L-shaped cross-sectional shape is achieved on an inner peripheral side of the carrier cover 41 where the base portion 41b is flat, and a generally J-shaped cross-sectional shape is achieved on the inner peripheral side of the carrier cover 41 where the base portion 41b is a recessed general U shape.

The cancel plate 25 includes a cylindrical portion 25c that is fitted with the boss portion 22a, which is arranged concentric with the input shaft 1, of the clutch drum 22, as well as the support portion 25e, whose movement is restricted by the snap ring 24, on an end portion thereof. In addition, the cylindrical portion 25c is formed with a drain groove 25d in the axial direction of the input shaft 1, wherein the drain groove 25d discharges lubricating oil in the cancel oil chamber 25A formed from the cancel plate 25 and the piston member 26. Moreover, the support portion 25e is formed with the drain groove 25b in a radial direction from the input shaft 1. Therefore, lubricating oil leaking from the cancel oil chamber 25A formed from the cancel plate 25 and the piston member 26 can be efficiently used.

The peripheral-direction oil sump groove 40 opening in the axial direction of the input shaft 1 in the present embodiment is specified as a peripheral-direction groove opening in the axial direction of the input shaft 1. Therefore, the radial depth of the oil sump groove 40 is determined by the inward end portion 33a of the clutch hub 33 and the wall portion 41a of the carrier cover 41. The width of the oil sump groove 40 is determined by the base portion 41b of the carrier cover 41 extending in the axial direction of the pinion shaft 4.

According to the lubricating oil feeding device for an automatic transmission according to the present embodiment, a resin washer 45 is provided that restricts the axial movement of the clutch hub 33 in a space between the clutch hub 33 and the cancel plate 25 of the clutch 30 and forms the oil sump groove 40 extending in the radial direction of the input shaft 1. Also, the resin washer 45 is formed with the groove 46 extending in the radial direction. As a consequence, when lubricating oil exceeds the inward end portion 33a of the clutch hub 33 and flows toward the resin washer 45 side, the lubricating oil is fed to the plurality of clutch plates 31 and clutch discs 32 of the clutch 30 via the radial-direction groove 46 of the resin washer 45. Thus, lubricating oil can be sufficiently fed even in an automatic transmission with a compact structure.

Furthermore, the resin washer 45 of the lubricating oil feeding device for an automatic transmission according to the present embodiment is provided between the clutch hub 33 and the support wall portion 25a of the cancel plate 25 of the clutch 30. One side of the support wall portion 25a is provided with the resin washer 45 while another side is provided with the return spring 27. Therefore, it is possible to feed lubricating oil to the plurality of clutch plates 31 and clutch discs 32 of the clutch 30 without affecting mechanical strength, and also possible to achieve an automatic transmission with a compact structure.

In addition, regarding the drain groove 25b on the cancel plate 25 of the clutch 30 in the lubricating oil feeding device for an automatic transmission according to the present embodiment, since a groove is formed in the radial direction from the input shaft 1, lubricating oil is flung from the drain groove 25b generally perpendicular to an outer peripheral side by the centrifugal force caused by rotation of the cancel plate 25. Therefore, the peripheral-direction oil sump groove 40 of the carrier cover 41 can receiving lubricating oil, and groove machining to form the drain groove 25b can also be easily performed.

Furthermore, since the cancel oil chamber 25A formed from the cancel plate 25 and the piston member 26 drains from the drain groove 25b and lubricating oil is fed from the lubricating oil hole 23 of the boss portion 22a of the clutch drum 22, lubricating oil delivered to the planetary gear is not solely influenced by hydraulic oil fed to the cancel oil chamber 25A formed from the cancel plate 25 and the piston member 26.

According to various exemplary aspects of the invention, an applicable pinion and a pinion shaft of the planetary gear to which lubricating oil is fed may be any pinion and pinion shaft in the case of a multi-speed automatic transmission. Also, the wall portion of the carrier cover extending in the radial direction of the pinion shaft and the base portion extending in the axial direction of the pinion shaft are not limited provided that respective cross-sectional shapes on an inner peripheral side of the carrier cover are a general L shape and a general half U shape (general J shape). The end portion on the inner peripheral surface of the clutch hub, which is connected with the base portion of the carrier cover, refers to an inner peripheral end portion of the clutch hub. The peripheral-direction oil sump groove opening in the axial direction of the input shaft is an oil sump groove formed by the wall portion of the carrier cover, the base portion of the carrier cover extending in the axial direction of the pinion shaft and the end portion on the inner peripheral surface of the clutch hub, which is connected with the base portion, with such an oil sump groove specified as being a peripheral-direction groove that opens in the axial direction of the input shaft. In addition, the depth of the oil sump groove is determined by the wall portion of the carrier cover and the end portion on the inner peripheral surface of the clutch hub, while the width is determined by the base portion extending in the axial direction of the pinion shaft. Furthermore, the oil passage is not limited provided that it delivers lubricating oil from the oil sump groove to the pinion shaft and provides lubrication for the planetary carrier. An oil sump groove and/or a lubricating oil hole may serve as the oil passage. In addition, lubricating oil to be fed from a lubricating oil hole of a clutch drum arranged in a periphery of the input shaft is delivered to the oil sump groove from a drain groove of a cancel plate without passing through an intermediary along the way is not limited provided that such lubricating oil is delivered to the oil sump groove by centrifugal force.

According to exemplary aspects of the invention, the plurality of drain grooves facing the oil sump groove on the cancel plate of the clutch are formed so as to have a good collection efficiency with respect to lubricating oil delivered from a drain groove by centrifugal force. Therefore, the mode of the plurality of drain grooves is not limited provided that the plurality of drain grooves has excellent collection efficiency.

According to exemplary aspects of the invention, the cylindrical portion fitted to the boss portion of the clutch drum is formed with a drain groove in the axial direction of the input shaft, which discharges lubricating oil from the cancel oil chamber, and the support portion whose movement is restricted by a snap ring or the like is formed with a drain groove in the radial direction from the center axis of the input shaft. Thus, neither the cylindrical portion nor the support portion are limited provided that both can be used for efficient lubrication of a planetary gear with lubricating oil from the cancel oil chamber.

According to exemplary aspects of the invention, lubricating oil between the drain groove that discharges lubricating oil in the cancel oil chamber and that is formed in the cylindrical portion and the drain groove formed in the support portion is discharged until an amount required to cancel out a centrifugal oil pressure within a servo oil chamber existing on the cancel oil chamber side is reached, and then delivered to the oil sump groove by centrifugal force.

According to exemplary aspects of the invention, lubricating oil is delivered from the lubricating oil hole formed in the base portion of the oil sump groove and formed in the radial direction of the pinion shaft, via the lubricating oil hole at the center of the pinion shaft and the lubricating oil formed in the radial direction of the pinion shaft, toward the peripheral direction of the pinion shaft.

According to exemplary aspects of the invention, in a lubricating oil feeding device for an automatic transmission, which feeds lubricating oil to a pinion and a pinion shaft of a planetary gear arranged in an internal portion of the automatic transmission, an oil sump groove that opens in a peripheral direction and an axial direction of an input shaft is structured by: a wall portion of a carrier cover formed radiating from a center of the input shaft and extending in a radial direction of the pinion shaft of the planetary gear; a base portion of the carrier cover, which extends in an axial direction of the pinion shaft, and an end portion on an inner peripheral surface of a clutch hub, which is connected with the base portion. Thus compared to cases in which the oil sump groove is formed by both sides of the carrier cover extending in the radial direction of the pinion shaft and by the base portion extending in the axial direction therebetween, it is possible to narrow a width in the axial direction of the input shaft to make the automatic transmission more compact overall. In addition, the oil sump groove is fed with lubricating oil from an inner peripheral side in the radial direction of the carrier cover. Therefore, lubricating oil from the oil sump groove can be delivered to the pinion shaft of the planetary gear, and the delivery of sufficient lubricating oil to the planetary gear can be ensured even when the automatic transmission is structured compact. Furthermore, lubricating oil to be fed from a lubricating oil hole of the clutch drum arranged in a periphery of the input shaft is delivered to the oil sump groove from a drain groove of a cancel plate without passing through an intermediary along the way. Therefore, since a pinion gear of the planetary gear rotates and revolves while the planetary gear is rotating, a relative rotation with the carrier supporting the pinion gear increases, and sufficient lubricating oil can be fed to the needle bearing, washer and the like of the pinion shaft. Moreover, since lubricating oil is delivered to the oil sump groove from the drain groove of the cancel plate without passing through an intermediary along the way, the lubricating oil is collected without having been distributed to other members.

According to exemplary aspects of the invention, the oil sump groove of the lubricating oil feeding device for an automatic transmission is arranged with a plurality of drain grooves facing the oil sump groove on the cancel plate of a clutch. Therefore, lubricating oil can be thrown from the plurality of drain grooves to the oil sump groove by centrifugal force, whereby a structure with good lubricating oil collection efficiency can be achieved.

According to exemplary aspects of the invention, the cancel plate of the lubricating oil feeding device for an automatic transmission has a cylindrical portion fitted with the boss portion of the clutch drum, and a support portion whose movement is restricted by a snap ring. The cylindrical portion formed with a drain groove in the axial direction of the input shaft, which discharges lubricating oil from a cancel oil chamber. The support portion is formed with a drain groove in a radial direction from a center axis of the input shaft. Therefore, it is possible to efficiently use lubricating oil employed to control the cancel oil chamber.

According to exemplary aspects of the invention, lubricating oil from the cancel oil chamber of the lubricating oil feeding device for an automatic transmission is delivered from the drain groove formed on the cylindrical portion, which discharges lubricating oil from the cancel oil chamber, and then guided to the drain groove formed on the support portion of the clutch drum, and fed to the oil sump groove via centrifugal force. Therefore, lubricating oil from the cancel oil chamber can be delivered to the pinion shaft of the planetary gear, and the delivery of sufficient lubricating oil to the planetary gear can be ensured.

According to exemplary aspects of the invention, lubricating oil delivered to the oil sump groove of the lubricating oil feeding device for an automatic transmission is fed to the pinion axially supported on the pinion shaft structuring the planetary gear of the automatic transmission and fed to a needle bearing between the pinion and the pinion shaft, via a lubricating oil hole formed in a base portion of the oil sump groove and formed in a radial direction of the pinion shaft, a lubricating oil hole at a center of the pinion shaft, and a lubricating oil hole formed in a radial direction of the pinion shaft. Therefore, since the pinion gear rotates and revolves while the planetary gear is rotating, a relative rotation with the carrier supporting the pinion gear increases, and sufficient lubricating oil can be fed to the needle bearing, washer and the like of the pinion shaft.

What is claimed is:

1. A lubricating oil feeding device for an automatic transmission, wherein the lubricating oil feeding device feeds lubricating oil to a pinion and a pinion shaft of a planetary gear arranged in an internal portion of the automatic transmission, the lubricating oil feeding device comprising:
    a carrier and a carrier cover that are attached to both ends of the pinion shaft of the planetary gear and that are arranged in an axial direction of an input shaft of the automatic transmission;
    an oil sump groove that opens in a peripheral direction and the axial direction of the input shaft, the oil sump groove is structured by a wall portion of the carrier cover formed radiating from a center of the input shaft, a base portion of the carrier cover that extends in an axial direction of the pinion shaft, and an end portion on an inner peripheral surface of a clutch hub that is connected with the base portion; and
    an oil passage that feeds lubricating oil from the oil sump groove to the pinion shaft, and provides the lubricating oil for the planetary gear.

2. The lubricating oil feeding device for the automatic transmission according to claim 1, wherein the oil sump groove is arranged with a plurality of drain grooves facing the oil sump groove on a cancel plate of a clutch.

3. The lubricating oil feeding device for the automatic transmission according to claim 2, wherein:
    the cancel plate is formed with a support portion that regulates axial movement on a boss portion of a clutch drum, and a cylindrical portion that is formed with a first drain groove in the axial direction of the input shaft that discharges lubricating oil from a cancel oil chamber, and
    the support portion is formed with a second drain groove in a radial direction from a center axis of the input shaft.

4. The lubricating oil feeding device for the automatic transmission according to claim 3, wherein lubricating oil from the cancel oil chamber is delivered from the first drain groove formed on the cylindrical portion, then guided to the second drain groove formed on the support portion, and then fed to the oil sump groove via centrifugal force.

5. The lubricating oil feeding device for the automatic transmission according to claim 1, wherein lubricating oil delivered to the oil sump groove is fed to the pinion axially supported on the pinion shaft and fed to a needle bearing between the pinion and the pinion shaft, via a lubricating oil hole formed in the base portion of the oil sump groove and formed in a radial direction of the pinion shaft, a lubricating oil hole at a center of the pinion shaft, and a lubricating oil hole formed in a radial direction of the pinion shaft.

6. The lubricating oil feeding device for the automatic transmission according to claim 1, wherein a silhouette line of an inner peripheral cross section of the carrier cover is an L shape.

7. The lubricating oil feeding device for the automatic transmission according to claim 1, wherein a height of the end portion of the clutch hub, when using a distance of the base portion of the carrier cover from the oil sump groove as a reference, is set lower than a height of the wall portion of the carrier cover.

8. The lubricating oil feeding device for the automatic transmission according to claim 7, wherein the lubricating oil collected in the oil sump groove that exceeds the end portion of the clutch hub is fed to a clutch.

9. The lubricating oil feeding device for the automatic transmission according to claim 1, wherein the lubricating oil is delivered from a lubricating oil hole of the input shaft, through a lubricating oil hole of a boss portion of a clutch drum, a drain groove formed on an end portion of a cancel plate of a clutch, and to the oil sump groove.

10. The lubricating oil feeding device for the automatic transmission according to claim 1, wherein a resin washer is provided that restricts an axial movement of the clutch hub in a space between the clutch hub and a cancel plate of a clutch, and forms the oil sump groove.

11. A lubricating oil feeding device for an automatic transmission, wherein the lubricating oil feeding device feeds lubricating oil to a pinion and a pinion shaft of a planetary gear arranged in an internal portion of the automatic transmission, the lubricating oil feeding device comprising:
    a carrier and a carrier cover that are attached to both ends of the pinion shaft of the planetary gear and that are arranged in an axial direction of an input shaft of the automatic transmission; and
    an oil sump groove that opens in a peripheral direction and the axial direction of the input shaft, the oil sump groove is structured by a wall portion of the carrier cover formed radiating from a center of the input shaft, a base portion of the carrier cover that extends in an axial direction of the pinion shaft, and an end portion on an inner peripheral surface of a clutch hub that is connected with the base portion, wherein:
    lubricating oil to be fed from a lubricating oil hole of a boss portion of a clutch drum arranged in a periphery of the input shaft is delivered to the oil sump groove from a drain groove formed in a radial direction of a cancel plate without passing through an intermediary along the way.

12. The lubricating oil feeding device for the automatic transmission according to claim 11, wherein the oil sump groove is arranged with a plurality of drain grooves facing the oil sump groove on the cancel plate of a clutch.

13. The lubricating oil feeding device for the automatic transmission according to claim 12, wherein:
the cancel plate is formed with a support portion that regulates axial movement on the boss portion of the clutch drum, and a cylindrical portion that is formed with a first drain groove in the axial direction of the input shaft that discharges lubricating oil from a cancel oil chamber, and
the support portion is formed with a second drain groove in the radial direction from a center axis of the input shaft.

14. The lubricating oil feeding device for the automatic transmission according to claim 13, wherein lubricating oil from the cancel oil chamber is delivered from the first drain groove formed on the cylindrical portion, then guided to the second drain groove formed on the support portion, and then fed to the oil sump groove via centrifugal force.

15. The lubricating oil feeding device for the automatic transmission according to claim 11, wherein lubricating oil delivered to the oil sump groove is fed to the pinion axially supported on the pinion shaft and fed to a needle bearing between the pinion and the pinion shaft, via a lubricating oil hole formed in the base portion of the oil sump groove and formed in a radial direction of the pinion shaft, a lubricating oil hole at a center of the pinion shaft, and a lubricating oil hole formed in a radial direction of the pinion shaft.

16. The lubricating oil feeding device for the automatic transmission according to claim 11, wherein a silhouette line of an inner peripheral cross section of the carrier cover is an L shape.

17. The lubricating oil feeding device for the automatic transmission according to claim 11, wherein a height of the end portion of the clutch hub, when using a distance of the base portion of the carrier cover from the oil sump groove as a reference, is set lower than a height of the wall portion of the carrier cover.

18. The lubricating oil feeding device for the automatic transmission according to claim 17, wherein the lubricating oil collected in the oil sump groove that exceeds the end portion of the clutch hub is fed to a clutch.

19. The lubricating oil feeding device for the automatic transmission according to claim 11, wherein the lubricating oil is delivered from a lubricating oil hole of the input shaft, through a lubricating oil hole of the boss portion of the clutch drum, the drain groove formed on an end portion of the cancel plate of a clutch, and to the oil sump groove.

20. The lubricating oil feeding device for the automatic transmission according to claim 11, wherein a resin washer is provided that restricts an axial movement of the clutch hub in a space between the clutch hub and the cancel plate of a clutch, and forms the oil sump groove.

* * * * *